United States Patent [19]
Fujii et al.

[11] Patent Number: 5,292,550
[45] Date of Patent: Mar. 8, 1994

[54] MANUFACTURING METHOD OF SUBSTRATE MEANS FOR OPTICAL RECORDING DISK AND APPARATUS THEREFOR

[75] Inventors: Seiro Fujii; Satoshi Jinno; Takahiro Kobayashi, all of Saitama, Japan

[73] Assignee: Pioneer Electronic Corporation, Tokyo, Japan

[21] Appl. No.: 822,749

[22] Filed: Jan. 21, 1992

[30] Foreign Application Priority Data

Jun. 20, 1991 [JP] Japan .................. 3-148643

[51] Int. Cl.⁵ .............................. B05D 5/06
[52] U.S. Cl. .................... 427/165; 427/162; 427/164; 427/277; 427/275; 427/355; 427/356; 427/389.7
[58] Field of Search ............... 427/162, 164, 278, 510, 427/277, 275, 270, 165, 389.7, 355, 356

[56] References Cited

U.S. PATENT DOCUMENTS 4,275,091 6/1981 Lippits et al. ................ 427/510

*Primary Examiner*—Janyce Bell
*Attorney, Agent, or Firm*—Sughrue, Mion, Zinn, Macpeak & Seas

[57] ABSTRACT

There is provided a substrate for an optical recording disk capable of preventing non-uniformity of thickness of the transfer layer due to a camber of the substrate, and having a transfer layer excellent in uniformity of the thickness thereof. The substrate for the optical recording disk is manufactured in such a manner that a portion ranging from a center portion to an outer circumferencial portion of the substrate is forcively deformed in advance prior to the formation of the transfer layer so as to provide substantially a conical-convex shape, and thereafter, the transfer layer is formed onto a surface side of the conical-convex shape of the substrate.

3 Claims, 7 Drawing Sheets

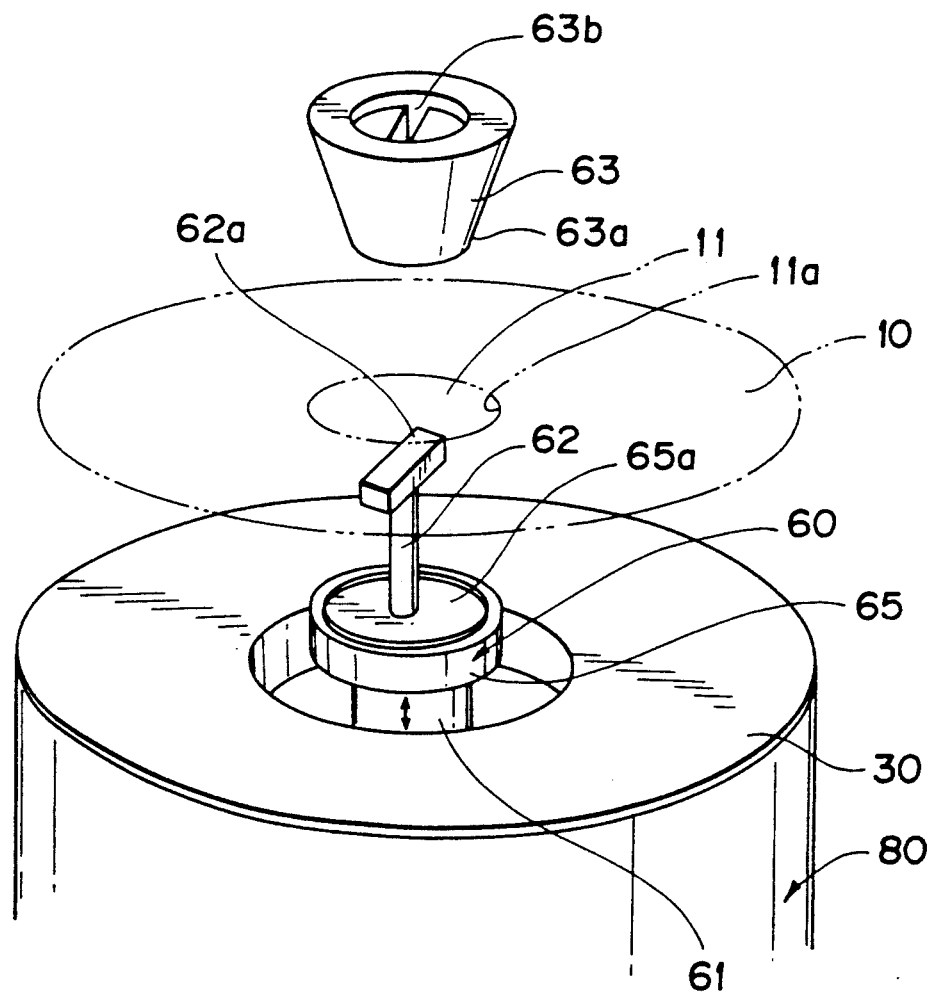
F I G. 1

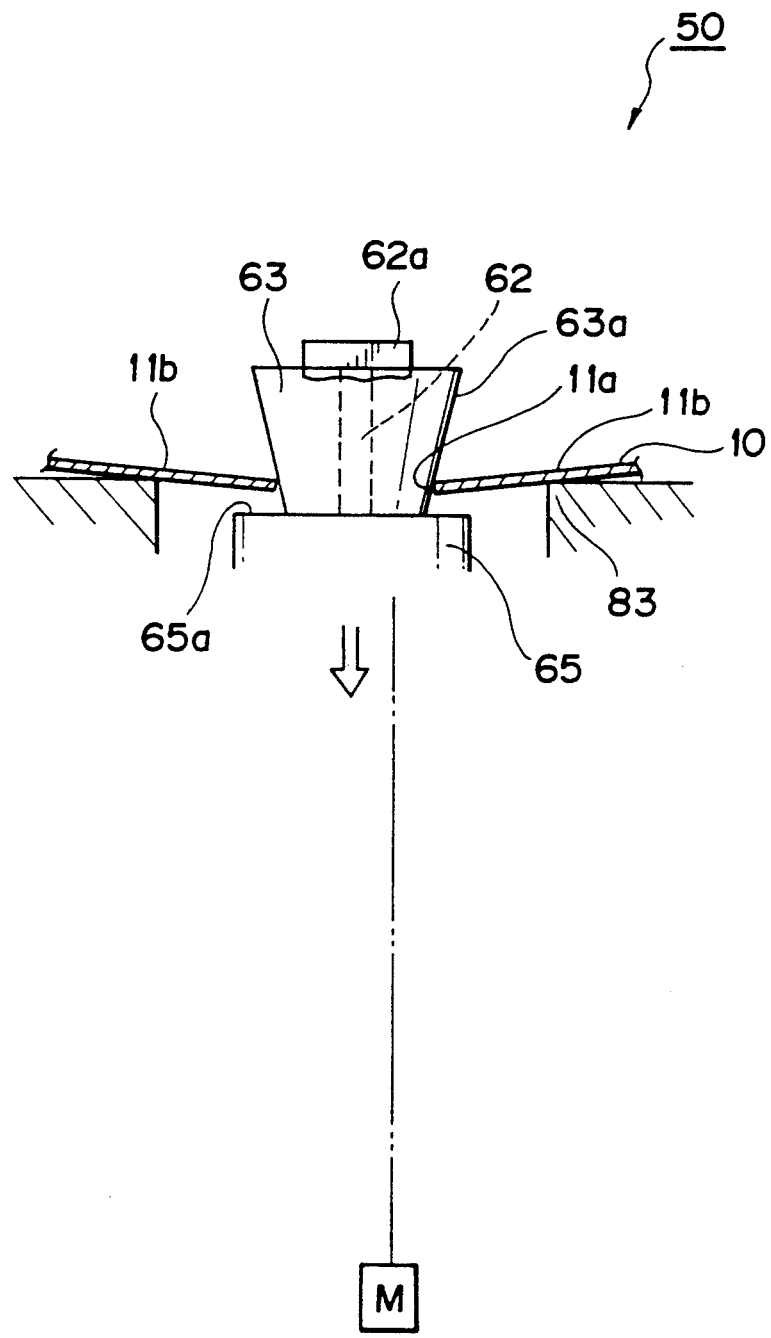

MANUFACTURING METHOD OF SUBSTRATE MEANS FOR OPTICAL RECORDING DISK AND APPARATUS THEREFOR

BACKGROUND OF THE INVENTION

The present invention relates to a manufacturing method of substrate means for optical recording disk comprising a disk-like substrate and a transfer layer having grooves formed on a surface of the substrate, and also relates to an apparatus for embodying the manufacturing method.

Generally, in an optical recording disk, tracking grooves are provided on a surface of a substrate in the form of concentric circles or spiral. As a method of providing such grooves, various methods are known. Among these, there has been proposed a method wherein the substrate and the grooves are integrally formed by utilizing a plastic injection molding technique. There has also been proposed a photo-polymerization method, so called, 2P method wherein a transfer layer having the grooves shall be provided on the substrate.

In these methods, the latter 2P method is effected in accordance with the following processes shown in FIGS. 7 to 10. That is, an ultraviolet setting resin solution 112a is coated onto either a surface of a groove forming original board 130 (hereinafter referred to as a "stamper 130") or a light transmissive substrate 111 which is formed of an optical glass or a transparent resin in the form of concentric circle with respect to a central axis (see FIG. 7). Then, the stamper 130 and the substrate 111 are press-contacted to each other thereby to spread over the coated ultraviolet setting resin solution. Thereafter, the ultraviolet setting resin solution 112a is set (or hardened) by irradiating the ultraviolet rays (UV) through the substrate 111, thereby to form a transfer layer 112 (see FIG. 8). When the transfer layer which is integrally formed with the substrate is released from the stamper 130, a groove pattern corresponding to a configuration of the stamper 130 is transferred and reproduced on a surface of the hardened transfer layer 112 (see FIGS. 9 and 10). Subsequently, a recording layer is formed on the surface of the transfer layer 112, and further, another substrate such as a protection plate is provided on the recording layer through an adhesive layer, whereby a conventional optical recording disk is manufactured.

In the transferring and reproducing process for forming the grooves of the conventional optical recording disk, however, the following problems have been raised.

That is, for example, a glass substrate to be used as a substrate for the optical recording disk does not originally have a complete flat surface, but necessarily have a camber of in some degree caused by various forming strains. Therefore, even though the transfer layer formed by utilizing the 2P method is formed on such a glass substrate, the thickness of the transfer layer will not become uniform. The non-uniformity of thickness of the transfer layer will cause a serious problem. That is, because an optical system of the optical recording disk has been designed in consideration of an aberration due to the thickness of the substrate so as to increase an aperture number (NA) of a lens, the non-uniformity of thickness of the transfer layer will have a great influence on the aberration.

SUMMARY OF THE INVENTION

The present invention is achieved to solve the above mentioned problems encounterred in the prior art, and an object of the present invention is to provide a manufacturing method of a substrate means for an optical recording disk and an apparatus for embodying the method which are capable of preventing non-uniformity of thickness of a transfer layer due to a camber of a substrate and capable of providing the substrate means for optical recording disk remarkably excellent in uniformity of the thickness of the transfer layer.

This and other objects can be achieved according to the present invention in one aspect by providing a manufacturing method of a substrate means for an optical recording disk comprising the steps of:

coating an ultraviolet setting resin solution onto either one of a stamper and a disk-like substrate having light transmissive property in the form of concentric circle with respect to a central axis of either one of the stamper and the substrate;

press-contacting the stamper to the substrate thereby to spread over the coated ultraviolet setting resin solution between the stamper and the substrate; and setting the ultraviolet setting resin solution by irradiating ultraviolet rays through the substrate to form a transfer layer;

wherein the substrate means is formed in such a manner that a portion of the substrate ranging from a center portion to an outer circumferencial portion thereof is forcibly deformed in advance prior to the formation of the transfer layer so as to provide substantially a conical-convex shape, and thereafter, the transfer layer which is solidified by a irradiation of the ultraviolet rays is laminated in a state of the substrate being deformed onto a convex side of the substrate having substantially the conical-convex shape.

In another aspect of this invention, there is provided an apparatus for manufacturing a substrate means for an optical recording disk comprising:

a first supporting body for disposing light transmissive substrate having a center hole thereon;

a second supporting body for disposing a stamper which is oppositely provided with respect to the substrate; and a drive unit for driving the first and second supporting bodies so as to render them close to each other, said first supporting body comprising a substrate disposing bed and an engaging member provided on the substrate disposing bed, the engaging member having a taper surface against which an inner circumferencial surface of a center hole formed in the substrate abuts, and said second supporting body comprising a cylinder shape body so as to enclose a center shaft of the first supporting body and having an abutting ring portion abutting against a periphery portion of the inner circumferencial surface of the center hole formed in the substrate.

According to the manufacturing method and the apparatus to be used therefor of the present invention, since the portion ranging from a center portion to an outer circumference of the substrate is forcibly deformed so as to have substantially a conical-convex shape in advance prior to the formation of a transfer layer, thereafter, the transfer layer is formed on the convex side of the conical-convex shape of the substrate. At this time, a returning force which may return the substrate from the camberred shape to an original shape is caused by the action of hardening and schrinkage of the transfer layer. Accordingly, the thickness of the transfer layer will become uniform due to the returning force.

These and other objects, features and advantages of the present invention will become more apparent upon a consideration of the following description of the preferred embodiment of the present invention taken in conjunction with the accompanying drawings.

BRIEF DESCRIPTION OF THE DRAWINGS

In the accompanying drawings:

FIG. 1 is a schematic perspective view showing an apparatus for manufacturing a substrate means for an optical recording disk according to an embodiment of the present invention;

FIG. 3 is a cross sectional view showing a state of a substrate means being forcibly deformed;

DESCRIPTION OF THE PREFERRED EMBODIMENTS

Figure 2:
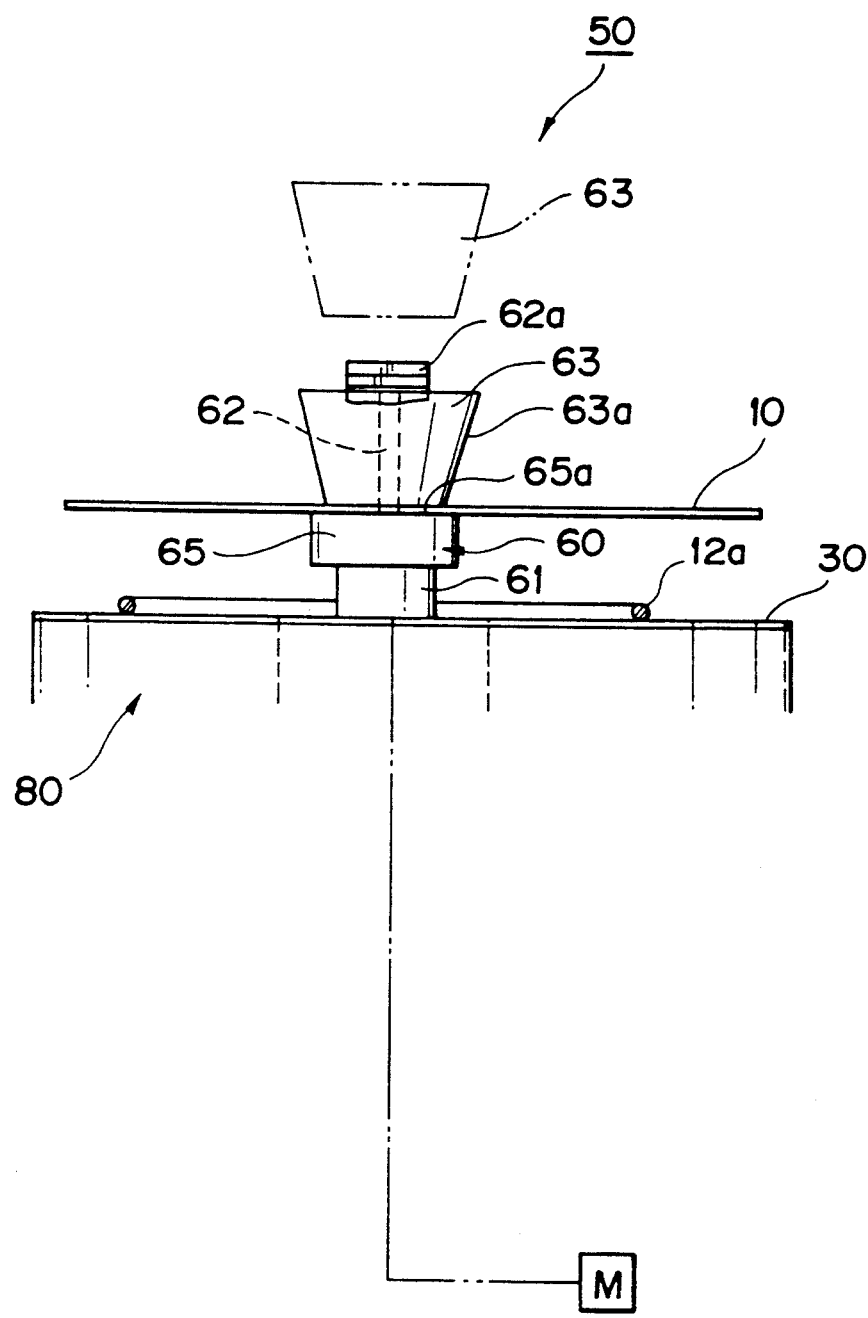
FIG. 2 is a front view showing an apparatus for manufacturing a substrate means for an optical recording disk according to the present invention.

Hereinbelow, an apparatus for manufacturing a substrate means for an optical recording disk according to the present invention will be specifically described with reference to the accompanying drawings of FIGS. 1 to 3.

The manufacturing apparatus 50 according to the present invention comprises a first supporting body 60 having a center portion on which a light transmissive substrate 10 having a disk-like shape may be disposed, a second supporting body 80 for fixedly disposing a stamper 30 which is oppositely provided with respect to the substrate 10 and which is disposed so as to enclose a part of an outer circumference of the first supporting body 60, and a drive unit M for driving the first and second supporting bodies 60 and 80 so as to render them close to each other.

The first supporting body 60 comprises a center shaft 61, a substrate disposing bed 65 and an engaging member 63 disposed on an upper portion 65a of the substrate disposing bed 65. The substrate disposing bed 65 is provided for the purpose of temporarily disposing the substrate 10. Therefore, the substrate disposing bed 65 is formed, e.g., in a shape of disk so that an outer circumferencial diameter of the substrate disposing bed 65 is larger than a diameter of a center hole 11 formed in the substrate 10. The engaging member 63 is formed in the shape of a frustum of cone having a tapered surface 63a against which an inner circumferencial surface 11a of the center hole 11 formed in the substrate 10 abuts. The tapered surface 63a is formed so as to expand from a lower portion toward an upper portion as viewed. The lower portion has a smallest diameter which is further smaller than that of the center hole 11. On the other hand, the upper portion has a largest diameter which is further larger than that of the center hole 11. Therefore, the center hole 11 of the substrate 10 is enabling to engage with the tapered surface 63a at a certain portion thereof. At an inner central portion of the engaging member 63 is formed a hole portion 63b into which a projection rod 62 extending from the upper portion 65a of the substrate disposing bed 65 is inserted (see FIG. 1). At a top end portion of the projection rod 62 is provided an engaging projection 62a extending horizontally. Thus, the engaging member 63 and the substrate disposing bed 65 are detachably connected to each other by means of a rotary locking mechanism wherein the engaging projection 62a is rotated at the state of the engaging projection 62a being inserted into the hole portion 63b so as to engage with an edge portion of the hole portion 63b.

The second supporting body 80 is formed in the form of a cylinder so as to enclose the center shaft 61 of the first supporting body 60 with a space.

Further, the second supporting body 80 comprises an abutting ring portion 83 against which the inner circumferencial periphery portion 11b of the center hole 11 formed in the substrate 10 abuts when the first and second supporting bodies 60 and 80 are rendered close to each other as shown in FIG. 3. The abutting ring portion 83 is provided for the purpose of forcibly camberring and deforming the substrate 10 temporarily to a predetermined direction. The shape or form of the abutting ring portion 83 is not particularly restricted so far as it engages with an inner circumferencial periphery portion 11b of the substrate 10. In the preferred embodiment as shown in FIG. 3, an upper end portion of the inner circumference of the second supporting body 80 constitutes the abutting ring portion 83.

As shown in FIG. 2, a stamper 30 is fixedly mounted to the top portion of the second supporting body 80. On an upper surface of the stamper 30 is formed a groove (not shown) for forming a corresponding groove pattern to be formed on the surface of the substrate 10. In this embodiment, the drive unit M is incorporated at the lower portion of the first supporting body 60 for vertically moving the first supporting body 60. As the drive unit M, various known driving mechanisms and driving power sources can be used.

Next, the manufacturing method of a substrate means for optical recording disk according to the present invention will now be described hereunder.

First, as shown in FIG. 2, ultraviolet setting resin solution 12a is coated onto the surface of the stamper 30 in the form of concentric circle with respect to the centeral axis of the stamper 30. The coating operation is effected in such a manner that an appropriate amount of the ultraviolet setting resin solution 12a is dropped onto the stamper 30 while the stamper 30 is rotated at a slow rotating speed of about 15 to 20 r.p.m.. The dropping amount of the resin solution may preferably be about 3 to 4 cc. At this time, the substrate 10 is disposed on the substrate disposing bed 65.

Figure 4A:
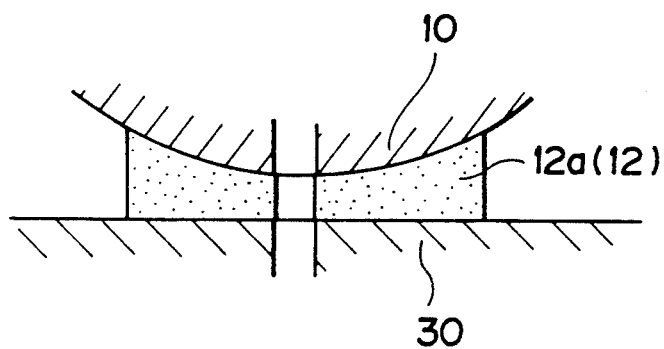
FIGS. 4(A) and 4(B) are schematic views respectively showing states before and after the ultraviolet setting resin solution is hardened.
Figure 4B:
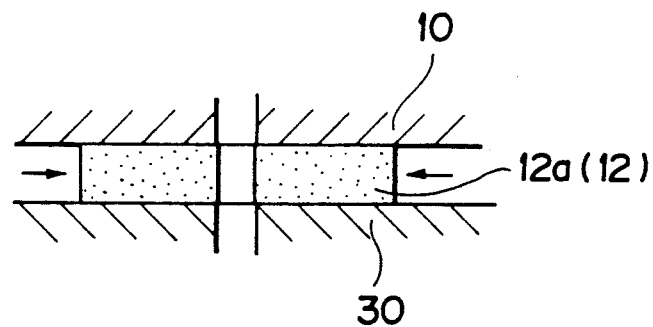

When the drive unit M starts to operate, the first supporting body 60 is slowly moved downwardly at a descending speed of about 1 to 2 cm/min. Even after the substrate 10 and the stamper 30 are contacted to each other, the first supporting body 60 continues to move downwardly. Then, as shown in FIG. 3, the tapered surface 63a of the engaging member 63 begins to engage with the inner circumferencial surface 11a of the center hole 11 formed in the substrate 10 at a certain descending position. When the descending movement is further continued, the portion ranging from a center portion to an outer circumferential portion of the substrate 10 is forcibly deformed so as to provide substantially a conical-convex shape while the abutting ring portion 83 of the second supporting body 80 is functioned as a fulcrum. At this stage of time, the descending movement of the first supporting body 60 is stopped. Then, the stamper 30 and the substrate 10 are in the state of being press-contacted through the medium of the coated ultraviolet setting resin solution 12a, whereby the coated ultraviolet setting resin solution 12a is spread over on the substrate 10. In this state, as schematically shown in FIG. 4(A), the coating amount of the ultraviolet setting resin solution is increased in the direction from the center of the substrate 10 to the outside thereof.

In such a case, an inclination (amount of camber to be straightened) of substantially the conical-convex portion of the substrate shall be set to a range of 0.01 to 1 mrad. (milliradian), more preferably 0.01 to 0.7 mrad.. When the value of the inclination is out of the range described above, the uniformity of the thickness of the transfer layer 12, which is caused on the basis of the hardening and schrinkage of the ultraviolet setting resin solution 12a, cannot be achieved.

In such a manner, in the state of the substrate 10 and the stamper 30 being press-contacted through the medium of the ultraviolet setting resin solution 12a, the ultraviolet rays are irradiated through the substrate 10 to the resin solution 12a, so that the ultraviolet setting resin solution 12a is hardened. At this time, there is caused hardening and schrinkage of the transfer layer 12, so that the thickness of the transfer layer 12 will become uniform and the substrate 10 is free from the camber.

Thereafter, when the transfer layer, i.e., the hardened ultraviolet setting resin solution 12a which is integrally formed with the substrate 10 is released from the stamper 30, a groove pattern of the stamper 30 is transferred and reproduced onto the surface of the hardened transfer layer 12, thus the substrate means for the optical recording disk according to the present invention being manufactured.

Figure 6:
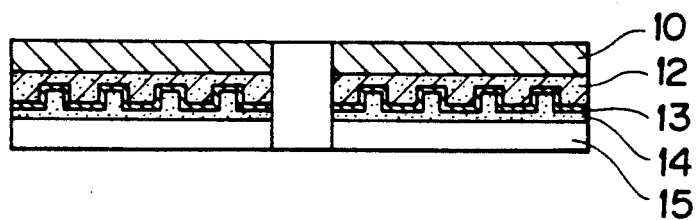
FIG. 6 is a cross sectional view of an optical recording disk.
Figure 7:
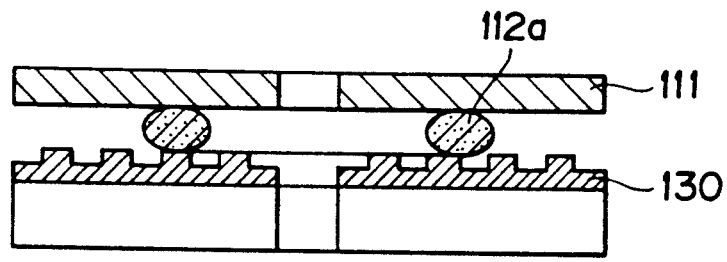
FIG. 7 is a schematic cross sectional view showing a state of the ultraviolet setting resin solution being dropped onto a stamper.
Figure 8:
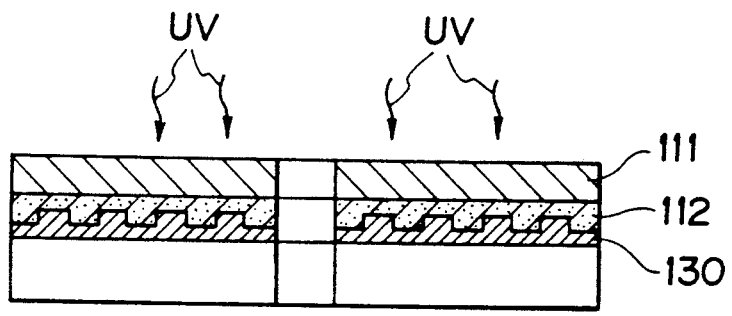
FIG. 8 is a schematic cross sectional view of the ultraviolet rays irradiation process.
Figure 9:
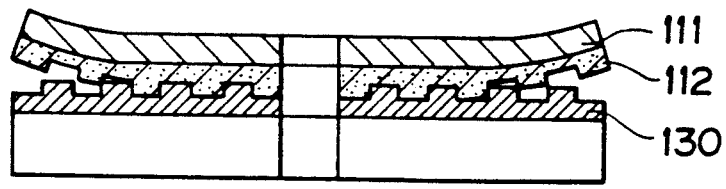
FIG. 9 is a schematic cross sectional view showing a state where the stamper is released from a substrate means in a transferring and reproducing process.
Figure 10:
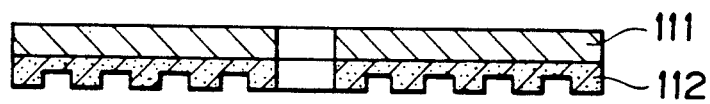
FIG. 10 is a cross sectional view of a substrate means for an optical recording disk.

Furthermore, as shown in FIG. 6, for example, a recording layer 13 is disposed on the surface of the transfer layer 12, and subsequently, another protecting substrate 15 is further disposed through the medium of an adhesive layer 14, thus the optical recording disk being finally manufactured.

By the way, the present invention has been described with reference to one preferred embodiment wherein the ultraviolet setting resin solution is first coated onto the stamper 30. However, as a matter of course, the positions of the stamper 30 and the substrate 10 may vertically be reversed so that the resin solution may first be coated onto the substrate 10.

The substrate 10 to be used in the present invention may be formed from a glass having a light transmissive (transparent) property or resins such as polycarbonate (PC) and polymethylmethacrylate (PMMA), etc.. The thickness of the substrate 10 may preferably be set to about 1.1 to 1.2 mm. Further, the recording layer 13 may be formed from a photo-recordable material. Specific examples of the preferred material constituting the recording layer 13 may include: photo-magnetic recording materials such as TeFeCo, GdTbFe, GaTbCo, GdFeBi, DyFe, GdFe, GdCo, BiSmYbCoGeIG, BiSmErGaIG, GdIG, CoCr, $CrO_2$, PtCo, EuOFe, EuO, MnCuBi, MnAlGe, MnBi, and the like; pit-forming type recording materials such as Te type compound, cyanine dye compound, and the like; phase changing type recording materials such as As-Te-Ge compound, Sn-Te-Se compound, $TeO_x$ compound $Sb_2Se_3$, and the like.

Hereinbelow, the present invention will now be described in more detail with reference to a concrete experimental sample.

EXPERIMENTAL SAMPLE

First, while a stamper 30 having a diameter of 327 mm was rotated, an ultraviolet setting resin solution 12a was continuously dropped onto the stamper 30 at a position of 100 mm apart from the center thereof, whereby a ring-shaped solution band having a width of about 10 mm was formed. A glass substrate 10 having a diameter of 300 mm and a thickness of 1.2 mm was disposed on a first supporting body 60 so as to oppose to the stamper 30 as shown in FIG. 2. Thereafter, the first supporting body 60 with the substrate 10 was moved toward the stamper 30, so that the stamper 30 and the substrate 10 were mutually press-contacted. Simultaneously, the coated ultraviolet setting resin solution 12a was spread toward both inner and outer circumferences of the substrate 10 thereby to coat the resin solution on an almost entire surface of the substrate 10. Subsequently, the coated ultraviolet setting resin solution 12a was hardened (set) by irradiating the ultraviolet rays (UV) through the substrate 10. Then, the stamper 30 was released from the substrate 10 thereby to form a transfer layer 12 onto the surface of the substrate 10.

In these experimental operations, the substrate was forcibly deformed by utilizing the apparatus shown in FIG. 1 so as to provide an approximate conical-convex shape. Then, a transfer layer was disposed on the substrate, whereby a Sample of a substrate means for an optical recording disk according to the present invention was manufactured.

On the other hand, a substrate which had been originally camberred was used as it was as a substrate, and a transfer layer was disposed onto a concave surface of the camberred substrate, whereby a Comparative Sample of a substrate means for an optical recording disk was manufactured.

Figure 5:
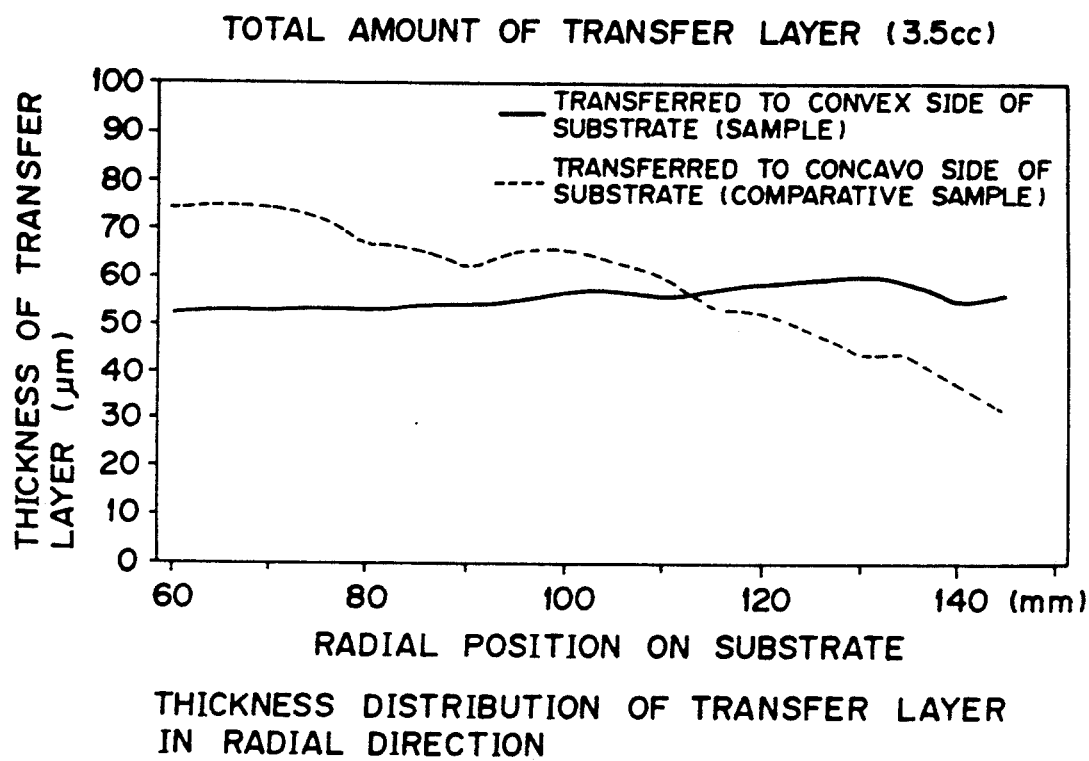
FIG. 5 is a graph showing a thickness distribution in the radial direction of the transfer layer.

Regarding the Sample and the Comparative Sample, the thickness distributions in the radial direction of the transfer layer were measured, respectively. FIG. 5 is a graph showing the results of this measurement.

As is clear from the graph shown in FIG. 5, it was confirmed that the thickness distribution in the radial direction of the transfer layer of the Sample according to the present invention was significantly uniform over the entire region of the transfer layer in comparison with that of the Comparative Sample shown in a dotted line.

As the result of the experimental data described above, the effects of the present invention will become apparent enough. That is, according to the present invention, prior to the formation of the transfer layer, a portion ranging from a center portion to an outer circumferencial portion of the substrate is forcibly deformed in advance so as to provide substantially a conical-convex shape, and thereafter, a transfer layer is formed onto the surface side of the substrate having substantially the conical-convex shape. Accordingly, the transfer layer having an uniform thickness can be obtained which is enough for practical use.

What is claimed is:

1. A manufacturing method of a substrate means for an optical recording disk comprising the steps of:

coating an ultraviolet setting resin solution onto either one of a stamper and a disk-shaped substrate having a light transmissive property in a form of a concentric circle with respect to a central axis of either one of the stamper and the substrate;

forcibly deforming a portion of the substrate ranging from a center portion to an outer circumferential portion thereof into substantially a conical-convex shape;

press-contacting the stamper to the substrate thereby to spread the coated ultraviolet setting resin solution between the stamper and a convex side of the substrate; and setting the ultraviolet setting resin solution by irradiating ultraviolet rays through the substrate thereby to form a transfer layer on the substrate.

2. A manufacturing method of a substrate means for an optical recording disk according to claim 1, wherein an inclination of a conical-convex surface of the substrate is 0.01 to 1 mrad.(milliradian).

3. A manufacturing method of a substrate means for an optical recording disk according to claim 1, wherein the substrate is formed of glass material.

* * * * *